United States Patent [19]

Warren

[11] 4,238,804

[45] Dec. 9, 1980

[54] STITCHING METHOD AND APPARATUS FOR MULTIPLE NOZZLE INK JET PRINTERS

[75] Inventor: W. Thomas Warren, Webster, N.Y.

[73] Assignee: Xerox Corporation, Stamford, Conn.

[21] Appl. No.: 16,256

[22] Filed: Feb. 28, 1979

[51] Int. Cl.³ .......... G01D 15/18
[52] U.S. Cl. .......... 346/75
[58] Field of Search .......... 346/75

[56] References Cited

U.S. PATENT DOCUMENTS

| | | | |
|---|---|---|---|
| 3,298,030 | 1/1967 | Lewis | 346/75 |
| 3,373,437 | 3/1968 | Sweet | 346/75 |
| 3,769,630 | 10/1973 | Hill | 346/75 |
| 3,786,517 | 1/1974 | Krause | 346/75 |
| 3,877,036 | 4/1975 | Loeffler | 346/75 |
| 3,886,564 | 5/1975 | Naylor | 346/75 |
| 3,956,756 | 5/1976 | Paton | 346/75 |
| 3,992,713 | 11/1976 | Carmichael | 346/75 |
| 4,067,019 | 1/1978 | Fleischer | 346/75 |

OTHER PUBLICATIONS

Fowler, R. L., Ink Jet Copier Nozzle Array, IBM Tech. Disc. Bulletin, vol. 16, No. 4, Sep. 1973, pp. 1251-1253.
Albrecht, D. W., Automated Two Axis Ink Jet Directionality Tester, IBM Tech. Disc. Bulletin, vol. 19, No. 3 Aug. 1976 p. 1077.
Pimbley et al., Electronic Aiming of Ink Jets, IBM Tech. Disclosure Bulletin, vol. 19, No. 12, May 1977, pp. 4562-4563.

*Primary Examiner*—Joseph W. Hartary
*Attorney, Agent, or Firm*—Michael H. Shanahan

[57] ABSTRACT

A pictorial ink jet printer is disclosed. The printer uses a linear array of nozzles each of which records a segment of a row of pixels in a given raster pattern. The pixel segment is recorded by electrostatically deflecting the ink drops from a nozzle to the pixels contained within the segment. The drops from adjacent nozzles are "stitched" or aligned to these ideal pixel positions by aligning the ink drop streams to drop position sensors. Two sensors are used for each nozzle. Preferably, adjacent nozzles share sensors. The sensors are spaced relative to each other to very close tolerances. Consequently, alignment of each nozzle to its two drop position sensors means that the drops from adjacent nozzles are aligned or "stitched."

16 Claims, 3 Drawing Figures

STITCHING METHOD AND APPARATUS FOR MULTIPLE NOZZLE INK JET PRINTERS

BACKGROUND

This invention relates to electrostatic ink jet method and apparatus. More specifically, the invention relates to multiple nozzle ink jet devices of the type that employ continuous streams of drops that are selectively diverted from a gutter to a target.

Ink jet marking technology is attractive in today's world because it converts information in electrical form directly into a tangible form, e.g. black ink on white paper. Ink jet devices using multiple nozzles offer this direct conversion capability at very high marking speeds.

Multiple nozzle devices are implemented in three types of architecture. One type is disclosed by Lewis et al in U.S. Pat. No. 3,298,030. Another architectural type is disclosed by Sweet et al in U.S. Pat. No. 3,373,437. A third ink jet architectural type for multiple nozzle devices is that disclosed by Paton in U.S. Pat. No. 3,956,756.

The Lewis et al device is a character printer. It employs multiple nozzles in a linear array with each nozzle assigned the task of composing all the characters required in a column of characters on a page. Collectively, the nozzles print rows and columns on the entire page. This device is totally unable to record pictorial information.

The Sweet et al device is a pictorial printer. The printer it discloses can create a raster pattern composed of multiple rows of spots, dots or pixels that cover an entire page. As such, by selectively diverting droplets between a gutter and the page, in a binary yes-no fashion, a wide variety of pictorial recordings can be created. Typically, the nozzles are aligned in a linear array. The number of nozzles is equal to the number of pixels within a row of a raster pattern. By moving the printer relative to the page or target, the linear array of nozzles are able to generate the plurality of rows that make up the raster pattern. A principal drawback with the Sweet et al type of architecture is the difficulty of manufacturing the plurality of nozzles close enough together to give adequate resolution for images required in high quality reproduction applications.

The Paton type architecture is also a pictorial printer that records a raster pattern in a fashion similar to the Sweet et al type of device. The difference is that a given pixel density (pixels per inch, ppi) is achieved with a fewer number of nozzles. This is made possible by linearly deflecting the drop stream from each nozzle along the row of the raster pattern.

The device disclosed by Paton pertains to the textile art and operates at pixel densities not suited for what is generally understood to be adequate for high quality reproduction work. The misalignment between the nozzles and the pixel positions, inherent to all multiple nozzle devices, imposes a serious limitation on the ability of a Paton type device to record information with an acceptable degree of accuracy and at a high enough quality level. One reason is that the drops in a Paton device are electrically aimed at an ideal pixel location rather than mechanically as with a Sweet et al device. In textile manufacturing, the Paton type of device is merely repetitively generating an aesthetic design and is not hampered with the restraints required when reproducing a message.

Accordingly, it is a primary object of the present invention to overcome the limitations of the foregoing types of multiple nozzle ink jet devices.

Another object of this invention is to design a high quality, high resolution pictorial ink jet printer.

A further object of the invention is to align the drops in traces of one nozzle relative to all the other nozzles in a multiple nozzle device of the type in which each nozzle covers a given number of pixel positions in the row of a raster pattern.

Yet another object of this invention is to employ drop position sensors adjacent a multiple array of nozzles designed to cover a given number of pixel positions in a row so that a raster is faithfully recorded.

The above and other objects of this invention are realized by locating drop position sensors adjacent an array of nozzles that sweep out traces to cover the pixel positions in a row of a raster pattern. Two position sensors are provided for each nozzle and, in a presently preferred mode the sensors are located so that adjacent nozzles share sensors. The sensor spacing relative to each other is of critical importance. The sensors are positioned on a common substrate with a high degree of accuracy and as such are like a surveyor's benchmark. The drops from a nozzle are charged so as to fly exactly under the sensors. First the drops are positioned under one sensor and then another. The nozzle in question is thereby charge amplitude calibrated relative to its two sensors or benchmarks. The other nozzles are similarly calibrated. Because the sensors are accurately aligned to each other, a fortiori, the drops from the calibrated nozzles are accurately aligned to a row of ideal pixel positions on a target.

The present multiple nozzle device is referred to as having the drops from its nozzles "stitched" together. The term "stitching" refers to aligning electrically the electrostatically deflected drops issued by a plurality of nozzles relative to ideal pixel positions on a target.

PRIOR ART STATEMENT

The U.S. Pat. No. 3,956,756 issued to Paton discloses a color pattern generator for the textile industry. A linear array of nozzles creates a row of spots on a fabric with each nozzle forming a trace of spots that is a segment of the row. Neither the alignment nor the accuracy of the alignment of the spots from segment to segment is discussed. The spot size is given in an example at Column 7, lines 25–29 as 4000 drops across a one meter fabric. For these dimensions, the spot size is 250 microns. It therefore takes 4000 spots of a 250 micron diameter spot to traverse a one meter wide fabric. This may be an acceptable resolution for the textile industry but it is not for high quality image reproduction. A 30–70 micron range for the spot diameter is more realistic for image reproduction. At Column 5, lines 19–22, Paton defines "small drops" as in the range of from 10 to 1000 microns. The device he describes, nonetheless, is not suited for image information reproduction because no provision is made for accurately aligning the electrostatically deflected drops to the pixel positions in a raster pattern.

The manufacture of a multi-nozzle device with component tolerances adequate to give alignment of spots having the 30–70 microns diameter is questionable and certainly not economically justifiable. Textile patterns are repetitive and do not represent "information" but rather are aesthetic designs having characteristics that are attributable to the misalignment of the spots relative to an ideal row of pixel positions. In other words, the misalignment is not a limiting parameter to generation of aesthetic patterns. It is for printing information.

The *IBM Technical Disclosure Bulletin,* Vol. 16, No. 4, of September, 1973 in FIG. 6 at page 1252 schematically discloses the lateral deflection of drops in a multiple nozzle array. This disclosure is much more limited than that by Paton and is also silent as to "stitching" of the spots.

The U.S. Pat. No. 3,886,564 to Naylor et al discloses a drop position sensor suited for the instant invention. It does not disclose the manufacture of a plurality of such sensors in an aligned fashion to act as benchmarks so that the drops from a plurality of nozzles can be stitched into a straight line.

The U.S. Pat. No. 3,992,713 to Carmichael et al discloses a single position sensor of Naylor et al in conjunction with a single nozzle. There is no disclosure of matching the trajectories of drops from two or more nozzles. Specifically, this reference does not contemplate testing the drop position at two separate sensors. (For an ink jet device disclosing two sensors with a single nozzle, see U.S. Pat. No. 3,769,630 to Hill et al.) In contrast, the present invention employs the two sensors to calibrate the charging of drops for a given nozzle to compensate for its unique velocity and charge to mass ratio. In addition, all the sensors are accurately aligned to each other thereby enabling spots created by the drops from all the nozzles to be stitched together in a straight line on a target with a density suited for quality image reproduction, e.g. about 200 spots per centimeter.

THE DRAWINGS

The foregoing and other features and objects of the invention are apparent from the reading of the specification and in conjunction with the drawings which are:

DETAILED DESCRIPTION

Figure 1:
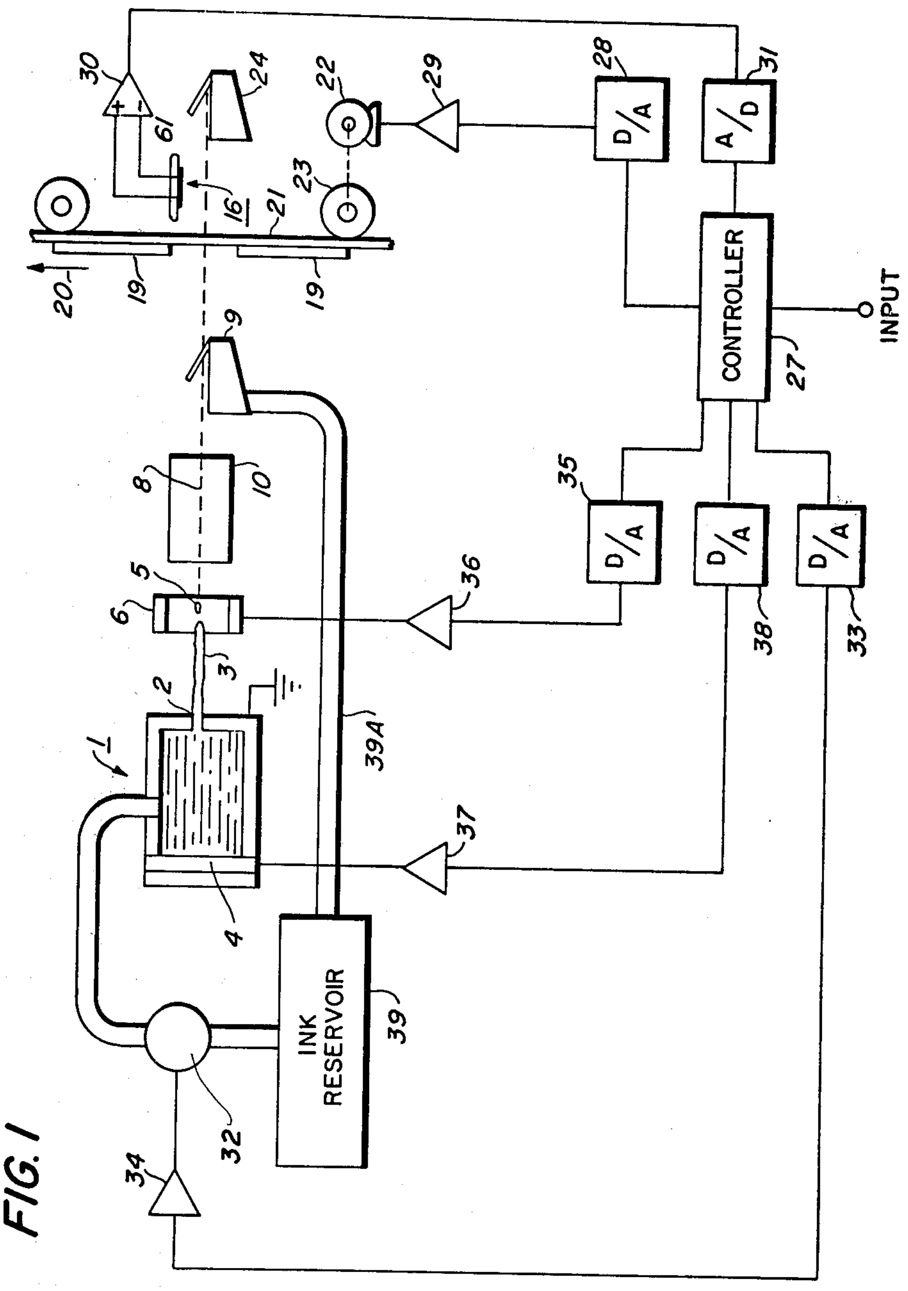
FIG. 1 is a side elevation view in schematic form of an ink jet printer according to the present invention.

The pictorial ink jet printer of FIG. 1 includes an ink manifold 1. The manifold has a plurality of nozzles 2 through which ink is emitted under pressure creating a continuous filament 3 of the fluid ink from each nozzle. A piezoelectric device 4 coupled to a wall of the manifold 1 periodically stimulates the fluid with a pressure wave which promotes the formation of drops 5 adjacent a charging electrode 6. The fluid ink is conductive. A voltage applied to the charging electrode at the moment of drop formation results in a drop 5 having a charge proportional to the applied voltage.

Not all drops are charged by electrode 6. The uncharged drops travel along a straight trajectory 8 to a gutter 9. The charged drops are deflected in a plane normal to FIG. 1 by deflection plates 10 and 11 (see FIG. 2) which have a high electrostatic field between them established by the + and − V potentials. Typically, the charging voltages applied to electrode 6 are in the range of 10 to 200 volts and the potential difference between the plates 10 and 11 is in the vicinity of 2000–3000 volts, by way of example.

Figure 2:
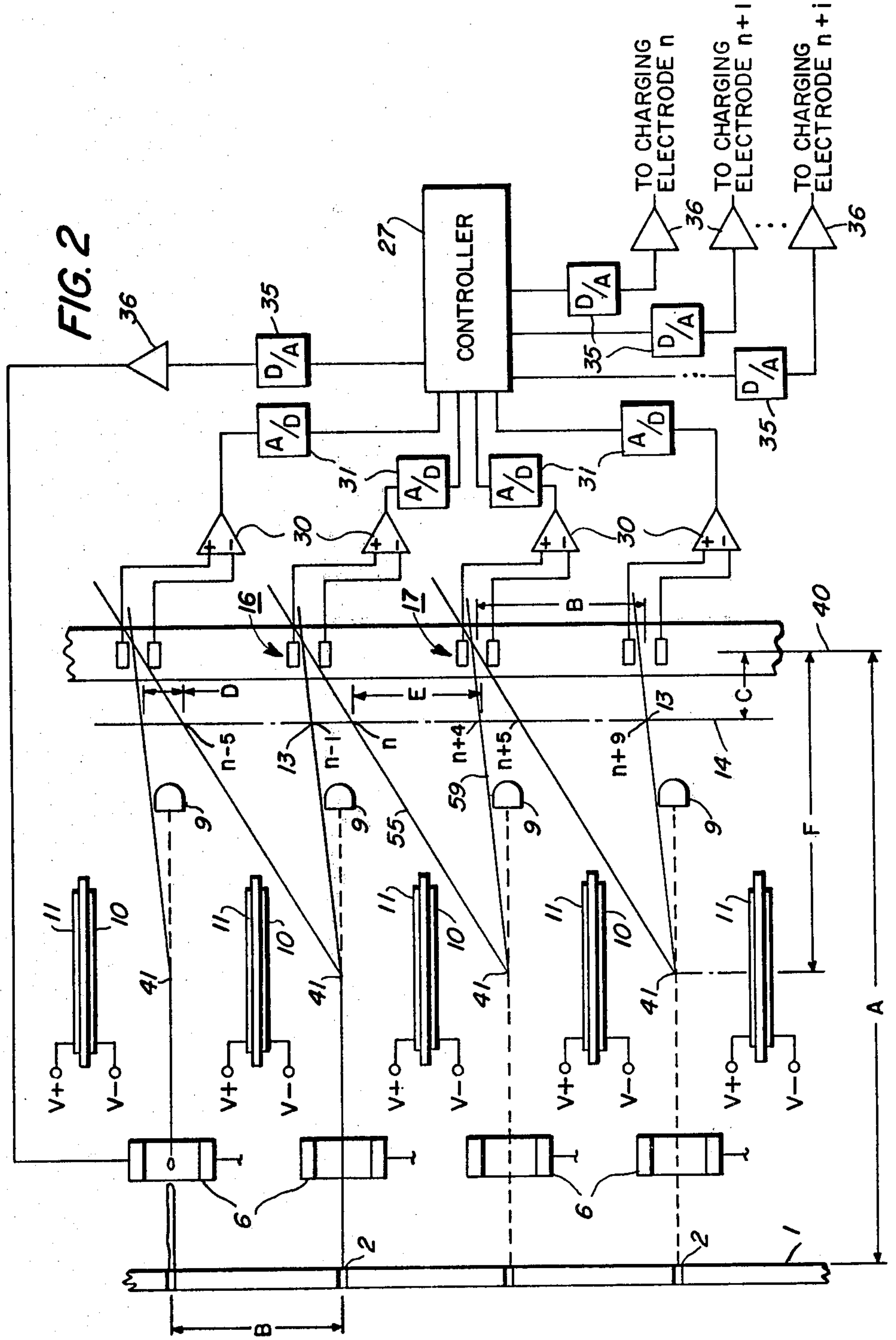
FIG. 2 is an elevation view of a portion of the printer of FIG. 1 illustrating the relation of the drop position sensors, recording plane, deflection electrodes, charging electrodes and ink jet nozzles.

Referring to FIG. 2, the charged drops from each nozzle form a trace of length E that is a segment of the entire row of pixel positions or points 13. The segments, for the example shown, include five pixels n through n+4 that are marked with drops from a given nozzle. The drops are about 0.035 millimeters (mm) in diameter and spread to a spot of about 0.05 mm when they impact a target. The pixel 13 is a point representing the center of a 0.05 mm spot. The pixels are ideal locations in a raster being spaced a distance D from each other. Stitching of the segments together is achieved when the nozzle to the left of the given nozzle is aligned to mark the n−1 through n−5 pixels and the nozzle to the right is aligned to mark the n+5 through n+9 pixels.

The intermediate pixels, for each nozzle such as pixels n+1 through n+3, are aligned because the electrostatic deflection is linear for drops of constant mass and constant velocity. The physical attributes of each nozzle and charging electrode differ such that the velocity and charge to mass ratio of the drops is unlikely to be constant for a multiple nozzle device. This invention overcomes those variations by using two benchmark sensors to tailor the charge for the drops issued from each nozzle. The tailored charge insures that a drop will go to a specific location regardless of the peculiarities of an individual nozzle.

The apparatus described by Paton and the IBM Technical Disclosure Bulletin, supra, do not provide for the nozzle to nozzle alignment of drops to an ideal row of pixels. As such, the drops from their nth nozzle are misaligned to the n through n+4 pixels by a first error factor and the adjacent left and right nozzles are misaligned by second and third different error factors to the respective n−5 through n−1 and n+5 through n+9 pixels. The fact that each nozzle has a different error factor has heretofore discouraged the development of ink jet recorders of the present type for high quality image reproduction.

A pair of sensors, e.g. sensors 16 and 17, operate in a position servo loop to adjust the charge needed to locate a drop stream directly under the sensors. The charge needed to center or align the drops to the two sensors is then known. The drop deflection process is substantially linear. Therefore, the drops from a given nozzle can be positioned accurately to all pixels within its range. Points at the extremes of a nozzle's deflection range are selected in the embodiment of FIGS. 1 and 2 so that adjacent nozzles can share sensors. In a given system, the designer could choose to have two sensors for each nozzle that are closer together or further apart rather than spaced at the extremes of the deflection range.

The alignment errors under discussion throughout are those in the plane of the streams, e.g. along the line 14 defined by the pixels n−5 through n+9. This is where the significant error occurs because drop placement is a function of the charge to mass ratio and velocity of a drop which varies with the manufacturing tolerances for the nozzles and other components, temperature, humidity and other difficult to control or predict parameters. Errors in elevation, i.e. normal to the line defined by the pixels n−5 through n+9, are generally constant being due to the mechanical alignment of a nozzle. These errors are compensated during initial assembly and by appropriate electrical techniques such as use of delay or advance in selecting a drop to be sent to the target, i.e. the record member. This correction holds for all the drops in a trace for a given nozzle. In other words, the lateral errors are constantly subject to change because the drop placement is an electrical process vulnerable to temperature, humidity et al. On the other hand, the elevation errors are basically constant due to some inherent mechanical offset to the sighting of the nozzles.

In the preferred embodiment, the sensors are located at the same spacing as the nozzles. They are shifted relative to the nozzles to permit the adjacent nozzles to share the sensors, i.e. the left sensor for one nozzle is the right sensor for its neighbor. The operation of the sensors and their dimensions and location are discussed more fully further in the description.

Returning to FIG. 1, the printer shown is designed to record information on record members 19. The record members are transported in a plane normal to the plane defined by the drop streams from the nozzles. The records travel at a constant velocity in the direction of arrow 20. The relative movement is selected to yield a plurality of rows of spots on the record member. The relative velocity is such to displace each row by about the distance D, for example. Other raster patterns are available depending upon the information being recorded.

The record members are transported by a conveyor 21 that is propelled by the motor 22 coupled to the drive gear means 23. The conveyor is any suitable device such as parallel belts supported by pulleys. The sensors, e.g. sensors 16 and 17, are located downstream from the record members 19. The belts are spaced so that the drop streams from the nozzles can reach the sensors when the record is out of the way. A collection tray 24 is located downstream of the sensors to catch the drops.

The system of FIG. 1 makes black marks on white paper, for example, in response to electrical information signals. The information or video signals are applied to the controller 27 which is a microprocessor such as the Exorciser Model 6800 sold by the Motorola Corporation. Video signals representative of an image, for example, are stored in designated memory locations within the controller.

The controller also includes output ports that issue electrical control signals to the various system components. A digital to analog (D/A) converter 28 and amplifier 29 couple the controller to the record transport motor 22. Under the direction of the controller, a record member 19 is moved by the transport to the vicinity of the ink jet streams. Prior to its arrival, the nozzles issue a series of streams to align the drops to the sensors, such as sensors 16 and 17.

Each sensor communicates with the controller 27 via a differential amplifier 30 and an analog to digital (A/D) converter 31. Firstly, the sensors are used to align the drop streams to their left and right sensors, e.g. sensors 16 and 17. The controller 27 performs the stitching process one nozzle at a time. For nozzle number 1, a Hi voltage is applied to the charge electrode for that nozzle (e.g. electrode 6) via a D/A converter 35 and amplifier 36 that charges a burst of 88 drops, for example, to the same charge level. The Hi voltage for the last stitching alignment is remembered by the controller. If the charge level given to the burst of 88 drops is too high or low to center the 88 drops relative to the left sensor (sensor 16 for example), the controller incrementally adjusts the Hi voltage applied to the charging electrode until the desired alignment is achieved. This is a position servo loop. The Hi voltage value that achieved alignment is stored in the memory of the controller.

A second burst of 88 drops is charged to a level by a Lo voltage to direct the burst over the right sensor 17. The Lo voltage applied to the charge electrode is stored in the memory of controller 27 from a previous alignment. Subsequent bursts of 88 drops are charged to incrementally different voltages until the desired alignment to sensor 17 is obtained. This new Lo voltage is stored in the controller memory. The controller 27, sensors 16 and 17 and charging electrode 6 define position servo means for positioning drop streams from a nozzle over two benchmarks from a plurality of aligned benchmarks.

Knowing the exact positions to which the Hi and Lo voltages place the drops of nozzle 1, the controller calculates the exact voltages needed to position drops to all the pixel positions it is assigned to mark. Nozzle number 2 is also exercised by the controller to align its drops to its left and right sensors. The process is repeated for a number of other nozzles. The calibrated Hi and Lo voltage values remain valid for periods of time up to several minutes. Therefore, all the nozzles in the array need not be aligned between the passage of every record member. Rather, a group of nozzles is aligned after each record member is recorded. The alignment procedure is fast enough to align several nozzles during the 2–3 centimeter interdocument (record members 19) gaps. Also, a group of non-adjacent nozzles can be aligned at the same time to greatly speed up the stitching process if it proves desirable to do so.

Secondly, the sensors detect the time of arrival of the drops from the charging electrode 6. This of course is a measure of drop velocity. If the drop velocities are high or low the controller issues a command to pump 32 to increase or decrease appropriately the fluid pressure at manifold 1. The command is supplied to the pump via the D/A converter 33 and amplifier 34.

Finally, the sensors are used by controller 27 to adjust the phase of the voltages coupled to the charging electrodes (typified by electrode 6). The synchronization techniques disclosed in the Carmichael et al patent supra are appropriate. Briefly, the voltage applied to a charging electrode to achieve a desired deflection must be timed or synchronized with the formation of a drop 5 from a filament 3. This timing is controlled by shifting the phase of the voltage applied to a charging electrode 6.

The controller 27 also includes an output to drive the piezoelectric device 4 that promotes the drop formation. The piezoelectric device is driven at a frequency that gives rise to drop generation rates of the vicinity of from about 100 to about 125 kilohertz (KHz). The amplifier 37 and D/A converter 38 couple the piezoelectric device and the controller together.

A fluid pipe 39A couples the gutter 9 to the ink reservoir 39 to permit the unused ink to be recycled.

Once the drop velocity adjustment, stitching process and phasing check are performed by the controller and sensor, the lead edge of a record member 19 comes to the printing zone, e.g. the line 14 in FIG. 2. Video signals stored in the controller memory are fed simultaneously to the multiple nozzles. At least several rows of video signals are buffered in the controller's memory to match the video signal input rate to the controller to the printing rate.

The dimensions in all the drawings are not to scale. Rather the relative sizes are exaggerated in order to clarify their function. The actual dimensions for the system of FIGS. 1 and 2 are: A is about 25.4 millimeters (mm) where A is the distance from the centerline 40 through the sensors, including sensors 16 and 17, and the exit of the nozzles 2; B is about 2.16 mm (i.e. 0.085 inch) where B is the spacing between nozzles and between the sensors including sensors 16 and 17; C is about 5 mm where C is the distance from the print line 14 and the sensor centerline 40; D is about 0.05 mm (50 microns) where D is the distance between pixel points 13 and is also about the diameter of a spot formed upon impact of a drop on a target; E is about equal to B minus one spot diameter D; and F is about 12.7 mm where F is the distance between the centerline of the sensors and the midpoint 41 between the deflection plates 10 and 11. The angle of maximum deflection for the nozzles is about 10 degrees. The spot resolution or spot density is about 200 spot per centimeter for high quality image reproduction. The acceptable spot density range is from about as low as about 100 spots per centimeter to above 200 spots per centimeter.

Figure 3:
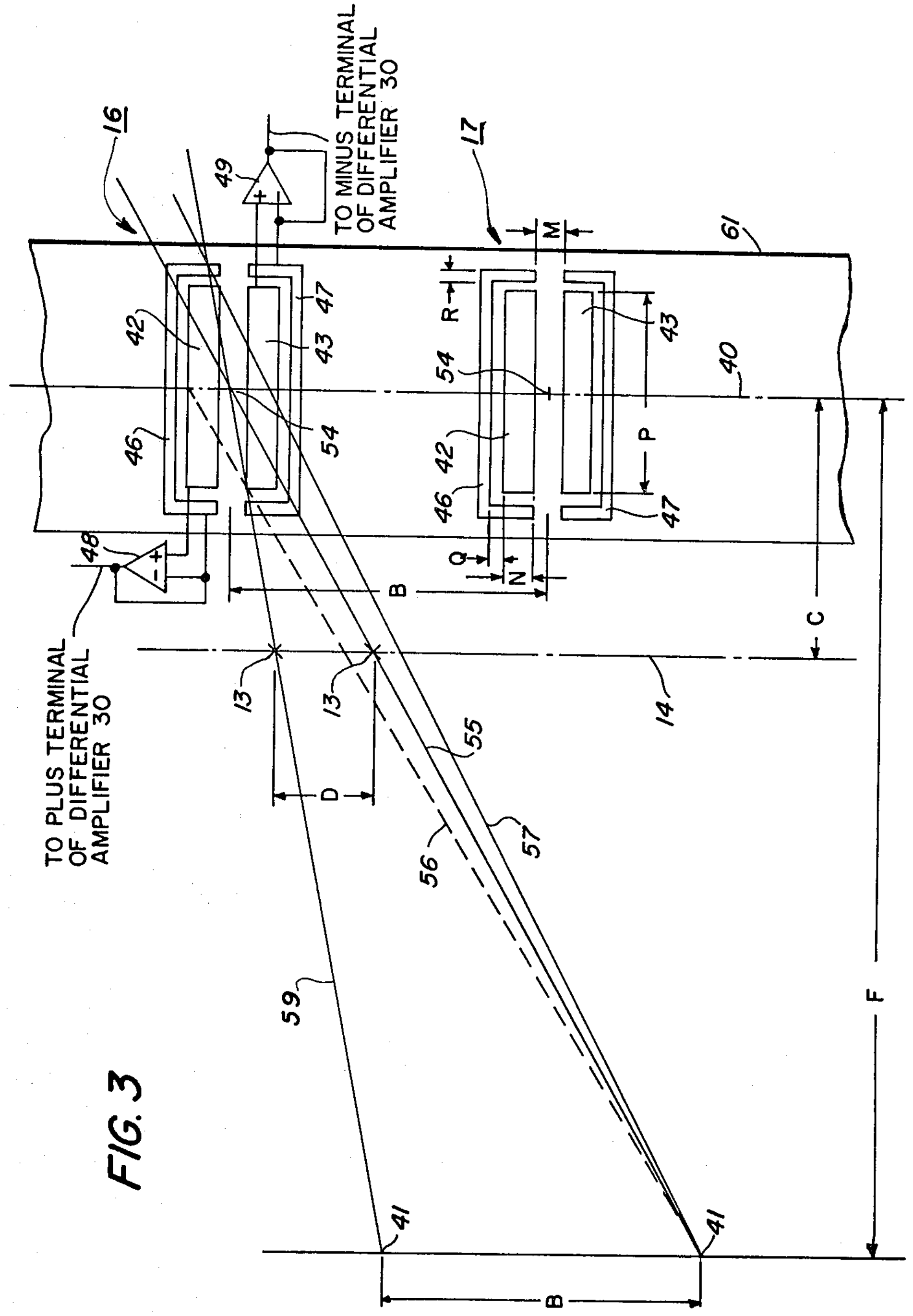
FIG. 3 is an enlarged elevation view of the position sensors in FIGS. 1 and 2.

The dimensions B, C, D and F are also shown in FIG. 3 but the scale is different than in FIG. 2. FIG. 3 is helpful for explaining the servo operation for centering or aligning the drop streams. The sensor 16 and 17 shown in this figure are typical of all the sensors. Each sensor includes two metal conductive plates 42 and 43. The benchmark point 54 to which the drops are aligned is the intersection between the sensor centerline 40 and the bisector of the distance M. The distance B is measured between the benchmark points 54 of adjacent sensors and in the instant embodiment is equal to the centerline to centerline spacing of the nozzles.

FIG. 2 shows the two plates of a sensor coupled directly to a differential amplifier 30. In practice, the sensors also include U-shaped, conductive guard rings 46 and 47 (FIG. 3) adjacent each of the capacitive sensor plates 42 and 43. The plates 42 and 43 are coupled to the high input impedence of the + terminals of the differential amplifiers 48 and 49 wired as voltage followers. The guard rings are coupled to the output terminals of the voltage followers. The outputs of the voltage followers are in turn coupled to the + and − terminals of differential amplifier 30 that develops the error signal. The guard rings and voltage followers are not shown in FIG. 2 to keep that drawing uncluttered to clarify the description. A guard ring shields a sensor plate from electrostatic charge except that on the drops in flight under it.

The presently preferred dimensions associated with the sensors of FIG. 3 are: M is about 0.2 mm where M is the space between the plates 42 and 43; N is about 0.5 mm where N is the width of a sensor plate; P is about 2.5 mm where P is the length of a sensor plate; Q is about 0.20 mm where Q is the space between a guard ring and sensor plate; and R is about 0.2 mm where R is the thickness of a guard ring. The overall width of a sensor is therefore about 2.0 mm which is compatible with a sensor to sensor spacing of about 2.16 mm.

A nozzle is aligned to the sensor benchmark point 54 when a trajectory passes directly under it. The aligned trajectory is represented by line 55. Drops flying under plates 42 and 43 along the trajectory 55 spend a like amount of time under the two plates. As explained in the Naylor et al patent supra, the charged drops induce equal charge in the two plates. The plates of each sensor are coupled respectively to the + and − terminals of its own differential amplifier 30 as explained above. The output of the differential amplifier is zero for the drop trajectory 55. The largest error signal from the amplifier 30 occurs when either the left or right trajectories 56 and 57 occur because one of the plates is missed by trajectories 56 and 57.

The differential amplifier 30 is coupled to the controller 27 through the analog to digital (A/D) converter 31. The non-zero outputs of the amplifier 30 are error signals which the controller 27 drives to zero by appropriately increasing or decreasing the voltage applied to the charging electrode, e.g. electrode 6, for a given nozzle.

The trajectory followed by a burst of drops sent to the sensor 16 is normally very close to the ideal trajectory 55. The angle between the ideal trajectory 55 and a large error trajectory 56 is very small being about one degree. These small angles enable a high degree of accuracy for drop alignment. The trajectory 59 is that for aligned drops coming from the adjacent nozzle that shares the sensor under examination. A like description pertains to its alignment.

The sensors, typified by sensors 16 and 17, are mounted on support or base member 61. The presently preferred support 61 is an epoxy fiberglass printed circuit board having a thickness that gives good mechanical stability, e.g. about 10 mm. The sensor plates 42 and 43 and the lead wires to them are formed by photoetching a 0.01 mm copper coating on the downward facing side of the board (FIG. 1). The photoetching printed wire board art is capable of making the present sensors with the stated dimensions. That is, the dimensions stated for multiple sensors 16 and 17 on board 61 are within the high yield production capabilities of current printed wiring board manufacturing processes.

The differential amplifiers 30, 48 and 49 (a group of three for each sensor 16) are implemented in integrated circuitry. The amplifiers are mounted on the upward facing side of the board 61 (see FIG. 1). In the embodiment of FIG. 1, Texas Instruments Model TL084 operational amplifiers are used. The TL084 includes four amplifiers per chip.

The sensor board or base 61 is aligned accurately to the nozzles 2 in the manifold 1 during assembly of the system. The board is oriented in a plane parallel to the plane of the plurality of drop streams as illustrated in FIG. 1. The board is located above the drop streams to minimize contamination from the ink. The precise mechanical layout of the sensors 16 on the board 61 is the critical aspect of the instant invention. A comparatively large alignment tolerance between the board 61 and manifold 1 is permissible relative to that for the sensor to sensor spacing. Errors in the former are compensated for by constant electrical biasing techniques. Errors in the sensor spacing are so small as to not effect the stitching process for the preferred resolution magnitude of about 100 drops per centimeter (cm) and greater.

The sensor to sensor spacing B on the support member 61 (i.e. board 61) is the critical dimension. The drops from each nozzle are servo positioned to left and right sensors 16 and 17 thereby enabling precise lateral deflection of the drops for a segment E. The precision is due to the fact that the exact charge is known for locating a drop from each nozzle to two given benchmarks. The benchmarks are all precisely aligned to each other, therefore, the drops from the plurality of nozzles are precisely aligned to each other.

Earlier it was stated that the pixel segment E covered by each nozzle is about equal to B, the sensor and nozzle spacing, minus one spot diameter D. Because the print plane 14, at which E is measured, is closer to the deflection point 41 than the sensor centerline 40, at which B is measured, the values of charge obtained for each nozzle must be converted to values slightly different to achieve stitching at the print plane 14. This correction is small (on the order of 10 percent) and is made by changing the charge for each jet by a constant factor.

Should the board 61 supporting the sensors 16 be shifted left or right relative to the nozzles, alignment is still achieved. Of course, the shift cannot be such as to cause a stream to hit a gutter 9 rather than the sensor. The lateral shifting of board 61 is not critical to the stitching because the sensor to sensor spacing is still maintained.

Other embodiments and variations of the foregoing are apparent from the foregoing and the drawings. It is the intention of this invention that all such modifications be encompassed within its scope.

What is claimed is:

1. Electrostatic ink jet apparatus for marking a record member with ink drops in a raster pattern having rows of pixel positions comprising a plurality of nozzles for emitting continuous streams of a conductive fluid and means for promoting the formation of drops from the streams at finite distances from the nozzles, a charging electrode associated with each nozzle adjacent the region of drop formation for charging drops, electrostatic deflection means associated with each nozzle for deflecting charged drops toward a segment of a row of pixel positions at a recording plane and stitching means for aligning the drops of adjacent nozzles to the pixel positions in the raster pattern including at least two drop sensor means associated with each nozzle and wherein the spacing between the sensor means is proportional to the spacing between pixel positions in a raster pattern.

2. The apparatus of claim 1 wherein the sensor means are located relative to the nozzles so that adjacent nozzles share at least one sensor means.

3. The apparatus of claim 1 including servo means coupled between the sensor means and the charging electrode means for varying a voltage applied to the electrode means until the drops are aligned to the sensor.

4. The apparatus of claim 3 further including storage means for storing the voltage that aligns the drops to a sensor means.

5. An electrostatic ink jet printing process comprising generating a plurality of ink drop streams, charging the drops in the streams to levels corresponding to video signals representative of pixel positions within a row of a raster scan pattern, deflecting the charged drops from each nozzles along a segment of a row of pixels according to the video signals and stitching the segments from each nozzle so that drops from adjacent segments are aligned to the pixel positions in a row including using at least two drop sensor means with each ink drop stream and spacing the sensor means proportionally to the spacing between pixel positions in a raster pattern.

6. The process of claim 5 wherein a recording member and the plurality of drop streams are moved relative to each other in a direction generally normal to the plane of the streams.

7. The process of claim 5 wherein the stitching step includes servoing drop streams over two drop sensor means and storing the charge levels which align the drop streams to a drop sensor means.

8. The process of claim 7 wherein adjacent drop streams are servoed over the same benchmark.

9. Electrostatic ink jet apparatus for marking a record member with ink drops in a raster pattern having rows of pixel positions comprising a plurality of nozzles for emitting continuous streams of a conductive fluid and means for promoting the formation of drops from the streams at finite distances from the nozzles, a charging electrode associated with each nozzle adjacent the region of drop formation for charging drops, electrostatic deflection means associated with each nozzle for deflecting charged drops toward a segment of a row of pixel positions at a recording plane and stitching means for aligning the drops of adjacent nozzles to adjacent pixel positions in the raster pattern including a plurality of drop sensor means spaced from each other by known intervals and located adjacent the paths of the drop streams for sensing the location of drops from each nozzle relative to at least two drop sensor means.

10. The apparatus of claim 9 wherein the drop sensor means are aligned in a row at constant intervals.

11. The apparatus of claim 9 wherein the intervals between drop sensor means is substantially the same as the intervals between nozzles.

12. The apparatus of claim 9 wherein the drop sensor means are located relative to the plurality of nozzles to permit adjacent nozzles to share a drop sensor means.

13. The apparatus of claim 9 wherein the stitching means includes servo means for positioning drops from a nozzle over the two drop sensor means associated with a nozzle.

14. The apparatus of claim 9 wherein the plurality of drop sensor means are mounted on a common support member that spans the drop streams emitted by the plurality of nozzles.

15. The apparatus of claim 9 wherein the stitching means further includes means for calibrating the voltages applied to the charging means to align drops to the pixel positions.

16. An electrostatic ink jet printing process comprising:

generating a plurality of ink drop streams, charging the drops in the streams to levels corresponding to video signals representative of pixel positions within a row of raster scan pattern, deflecting the charged drops from each nozzle along a segment of a row of pixels according to the video signals and stitching the segments from each nozzle so that drops from adjacent segments are aligned to the pixel positions in a row including spacing a plurality of drop sensor means from each other by known intervals and locating the drop sensor means adjacent the paths of the plurality of ink drop streams for sensing the location of drops from each nozzle relative to at least two drop sensor means.

* * * * *